United States Patent [19]
Green

[11] 3,913,061
[45] Oct. 14, 1975

[54] FOCUSING AND DEFLECTING SYSTEM FOR ACOUSTIC IMAGING

[75] Inventor: Philip S. Green, Redwood City, Calif.

[73] Assignee: Stanford Research Institute, Menlo Park, Calif.

[22] Filed: Apr. 25, 1973

[21] Appl. No.: 354,236

[52] U.S. Cl. ...... 340/5 MP; 73/67.8 S; 73/71.5 US; 181/176
[51] Int. Cl.² .......................................... G10K 11/06
[58] Field of Search ................ 181/.5 R, .5 NP, 176; 340/8 L, 5 R, 5 MP; 350/6; 73/67.7, 67.8 S, 71.5 US

[56] References Cited
UNITED STATES PATENTS

| | | | |
|---|---|---|---|
| 3,083,611 | 4/1963 | Ziolkowski | 350/6 |
| 3,226,721 | 12/1965 | Gould | 350/6 |
| 3,514,619 | 5/1970 | Ireland | 350/6 |

OTHER PUBLICATIONS

*Sound Focussing Lenses & Waveguides*, Tarnoczy, *Ultrasonics*, July–Sept. 1965, pp. 115–127.
Kock & Harvey, "Refracting Sound Waves," *Journal of the Acoustical Society of America*, Sept. 1949, pp. 471–481.

*Primary Examiner*—T. H. Tubbesing
*Assistant Examiner*—H. A. Birmiel
*Attorney, Agent, or Firm*—Urban H. Faubion

[57] ABSTRACT

Composite acoustic imaging and image deflection system adapted for use in a fluid medium and utilized for forming acoustic images with incident acoustic waves and at the same time deflecting or sweeping the image so formed over an image field so that the entire compressional acoustic image field of interest is swept by a line (in practice a linear array of transducers for converting the incident acoustic image compressional field to an equivalent electrical signal) contained in a plane which includes the axis of the incident acoustic image field. The imaging and image deflection system includes a composite lens assembly which incorporates two or more lens elements with a fluid filler medium contained therebetween to provide the focusing action and a pair of refracting prisms disposed between the lens elements (in the fluid medium) and mounted for counterrotation relative to each other, each in its own plane, to provide image deflection. In other embodiments the lens elements and prisms are combined by providing proper lens contours for prismatic lenses, e.g., by providing focusing lens contours on one side of each element and the slanting plane surface of a prism on the other face and providing means to counterrotate the lens elements so that the combined lens and prism elements perform both the focusing and image deflection functions. In order to reduce the radius of curvature of the lens elements and/or the slope of the sides of prisms to such an extent that mode conversion at liquid/solid interfaces is substantially eliminated while providing the required imaging and deflection (refraction), the materials of the lens, prisms and entrained liquid media are so selected that the velocity of propagation of acoustic waves in the medium at least on one side of the lens assembly is intermediate the velocity of propagation in the filler medium and the medium of the lenses and prisms.

23 Claims, 3 Drawing Figures

FIG_2

FOCUSING AND DEFLECTING SYSTEM FOR ACOUSTIC IMAGING

ORIGIN OF INVENTION

The invention described herein was made in the course of work under a grant or award from the Department of Health, Education and Welfare.

BACKGROUND OF THE INVENTION

The application of acoustic lenses which, in terms of accurate focusing, is most exacting is that of acoustic imaging for nondestructive testing. For "real time" ultrasonic imaging of organs in a living organism, e.g., a heart in a living human body, it is important to be able to sequester, in a fraction of a second, all acoustic waves containing image information and produce the "acuostic image" with a minimum of distortion and loss of acoustic energy. The composite image focusing and deflection assembly described here is specifically designed and constructed for such use and, therefore, the description is made in connection with this most demanding application. However, it will be particularly understood that the structures and principles are applicable in many other uses of acoustic imaging and image deflection. For example, a good application is for focusing and deflecting acoustic waves generated by a transducer.

A major loss of acoustic energy which would otherwise be available for acoustic imaging is caused by mode conversion at the interface between a liquid transmitting the acoustic waves and a solid, such as a lens or image deflection element. Specifically, we are concerned with a conversion of an incident compressional wave, which can be translated to a meaningful and useful acoustic image, to a shear wave, which in most systems is useless and in some measure is counterproductive. Because of the balance of shear strain at the liquid/solid boundary, there is no mode conversion when the incident compressional wave is normal to the surface of the solid encountered. However, as the angle of incidence increasingly departs from normal (consider this an increasing angle), more of the compressional wave is converted to shear wave energy and, indeed, there is an angle at which an incident compressional wave is substantially totally transformed into a shear wave.

Thus, the designer of acoustic imaging and image deflection elements is confronted with the problem of producing a lens and image deflection elements which provide the proper imaging and image deflecting action without presenting such a steep liquid/solid interface as to convert an appreciable amount of the incident compressional wave energy to energy in the form of shear waves.

A means of reducing the curvature of lens elements in a composite acoustic lens is found in the copending application entitled "Composite Acoustic Lens", Ser. No. 270,274, filed July 10, 1972, in the name of the present inventor and assigned to the assignee of the present invention. The teachings found in that application are employed here for the same purpose and the subject matter of that application is specifically incorporated herein by reference.

Visualization of acoustic wave fields has been the subject of extensive investigation with the result that a wide variety of demonstrated methods exist for converting a pattern of acoustic pressure fields in a fluid to a visible analog. A number of ultrasonographic methods have been devised that depend on the sensitivity to acoustic radiation of either photographic emulsions or certain chemical reactions.

However, sensitivities here are low (on the order of 1 watt per square centimeter) and exposure times of from minutes to hours are required. Numerous secondary effects of the acoustic energy absorbed by an insonified surface (e.g., luminescence, changes in color or electrical conductivity) have been used to produce both temporary and permanent images. Although these techniques are roughly an order of magnitude more sensitive than the previous ones, they are still too insensitive for practical diagnostic visualization. A somewhat more sensitive, but still slow to respond method is one in which the orientation produced by an ultrasonic field in a suspension of metal platelets is detected by optical scattering. The methods for acoustic imaging that have received the most widespread attention in recent years are those based on piezoelectric conversion of instantaneous acoustic pressures to proportional electric potentials. A two-dimensional ultrasonic pressure pattern in a fluid can be detected with great sensitivity by mechanically scanning a small piezoelectric probe over a region of the fluid through which the sound passes.

With each of the above methods, long exposure or scanning times preclude real time ultrasonic visualization. Real time visualization is, of course, highly important for medical applications. For example, the ability to observe an organ continuously as its aspect is varied, or (as may be possible with some organs) as the patient displaces it through muscular action, would be of considerable benefit to the diagnostician. To achieve this, a real time conversion method is required.

The method of optical Bragg diffraction (actually, not simply an image plane conversion method, since it embodies a distinctly different principle of image formation) is potentially capable of extremely high resolution. However, it is impractical for use at the low megahertz frequencies required for diagnostics. The method of liquid surface relief is showing greatly improved image fidelity and sensitivity. However, with the present state of the art, the sensitivity is still marginal for diagnostic use and dynamic range sufficient for this application has not been demonstrated. Laser interferometer techniques of image conversion show promise, particularly because of their potentially high sensitivity and large image area. However, they have not yet achieved adequate sensitivity and the laser and other optical components require a large stable platform, which cannot be incorporated into a small camera unit. Another possibility, the Sokoloff tube, consists of a resonant quartz face plate on an electron-beam scanning tube. In spite of considerable effort to improve it, however, the Sokoloff tube still lacks adequate resolution and sensitivity, and is beset by reliability problems.

The best approach to real time visualization of acoustic wave fields appears to involve provision of an array or arrays of discrete piezoelectric receiving elements which are sequentially sampled in synchronization with a cathode-ray-tube display by electrical gate-circuits. Ideally, the entire image plane would be filled by a rectangular matrix of 40,000 to 1000,000 receiving elements. However, the problems of producing and attaching an equal number of electronic switches and amplifiers to these elements in a confined space in a practical configuration and at reasonable cost are still beyond the state of the art. A good compromise is achieved, however, by using a hybrid converter consisting of a line array of discrete piezoelectric elements, electronically scanned at a high rate while the entire line is mechanically translated across the image plane or, alternatively, the acoustic image field is moved past the stationary array.

A converter employing this general concept is described and claimed in copending application entitled "Linear Transducer Array for Ultrasonic Image Conversion", Ser. No. 291,002, filed Sept. 21, 1972, in the name of the present inventor and assigned to the assignee of the present invention. The present focusing and deflecting system is designed specifically to be used with such an array; however, it would be apparent that its usage is broader.

From a technical design and equipment point of view, it is considered better to provide reflective or refractive means to move the compressional acoustic image field past the stationary array. A requirement of such an approach is that the entire image field be swept past the linear array and that there be such coordination between the field deflection system, the linear transducer array and the signal sampling system that the full image can be reconstructed.

SUMMARY AND OBJECT OF INVENTION

The present invention provides an ultrasonic image focusing and deflection system for focusing an ultrasonic compressional image on a surface, e.g., a plane or the surface of the segment of a sphere, and for cyclically displacing all points on the compressional image field surface so that they all pass a line whereby the entire image field may be converted by a single line array of transducer elements to a signal capable of use in presenting a visual image.

A composite acoustic focusing lens and image deflection assembly intended for use in liquid media is provided with two or more solid lens and image deflection elements which include therebetween a liquid filler medium. The materials of the composite acoustic lens and image deflection elements are so chosen that the velocity of propagation of acoustic waves in the medium on at least one side of the composite assembly is intermediate of the velocity of acoustic waves in the media of acoustic lens and image deflection elements and in the liquid fillerr medium. By proper selection of the relative velocity of propagation of acoustic waves in the lens and deflection elements, the surrounding liquid medium and the liquid filler medium in the composite assembly, the angle of incidence of the compressional image field on the surface of solid lens and image deflection elements is reduced significantly (made more nearly normal) and, in fact, reduced to such an extent that mode conversion at the liquid/solid interfaces is substantially eliminated while the required imaging and image deflection are provided. That is, the radius of curvature of solid lens elements is significantly increased, and the angle of planar faces of image deflection elements relative to the axis of incidence of a compressional image field is significantly reduced.

The novel features which are believed to be characteristic of the invention are set forth with particularity in the appended claims. The invention itself, however, both as to its organization and method of operation, together with further objects and advantages thereof may best be understood by reference to the following description taken in connection with the accompanying drawings.

DESCRIPTION OF PREFERRED EMBODIMENTS

Figure 1:
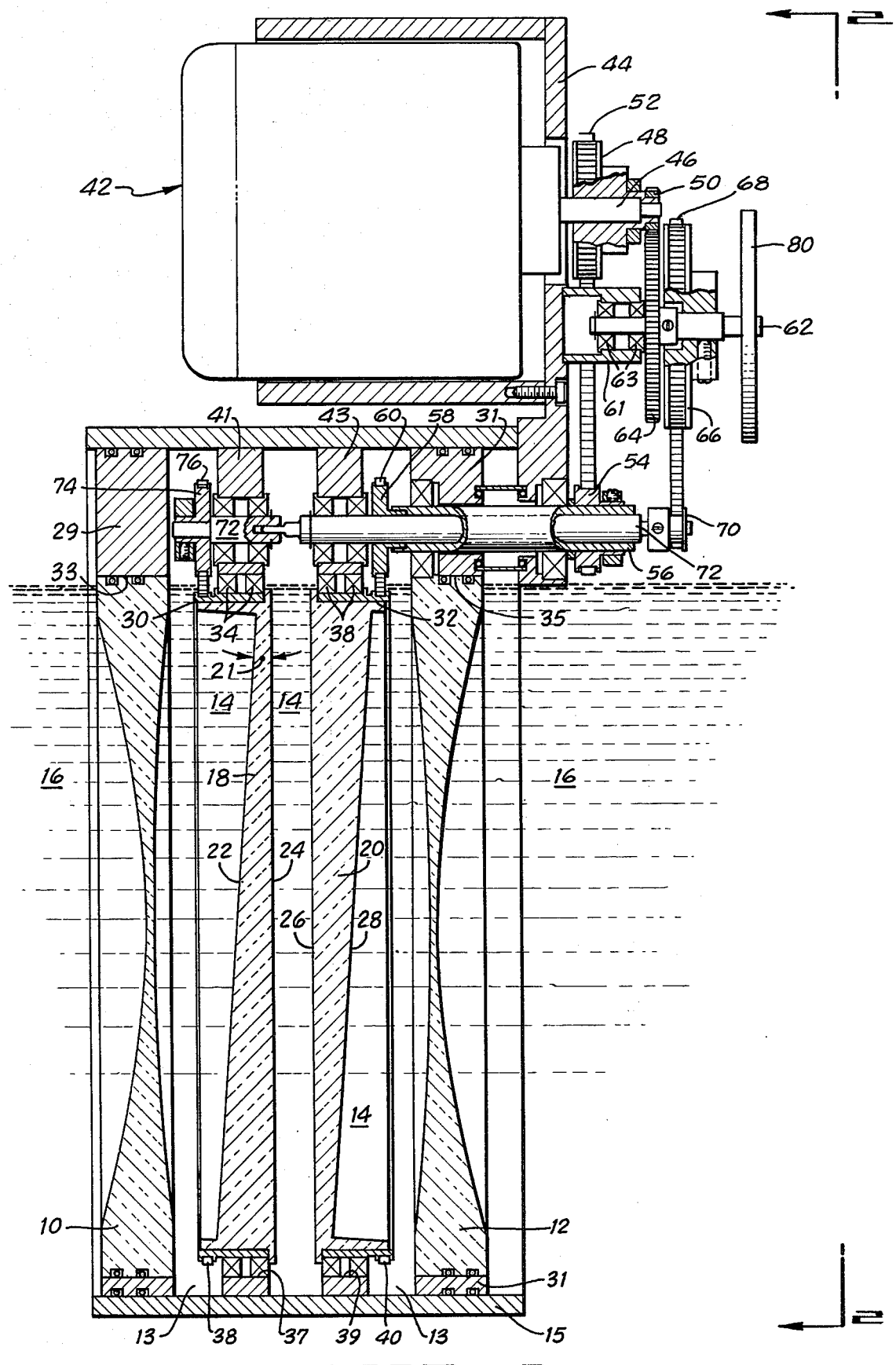
FIGS. 1 and 3 are central, vertical, longitudinal sections (along section line 1—1 of FIG. 2) through image deflection and focusing assemblies which illustrate the concept of the invention utilizing two different lens configurations.
Figure 2:
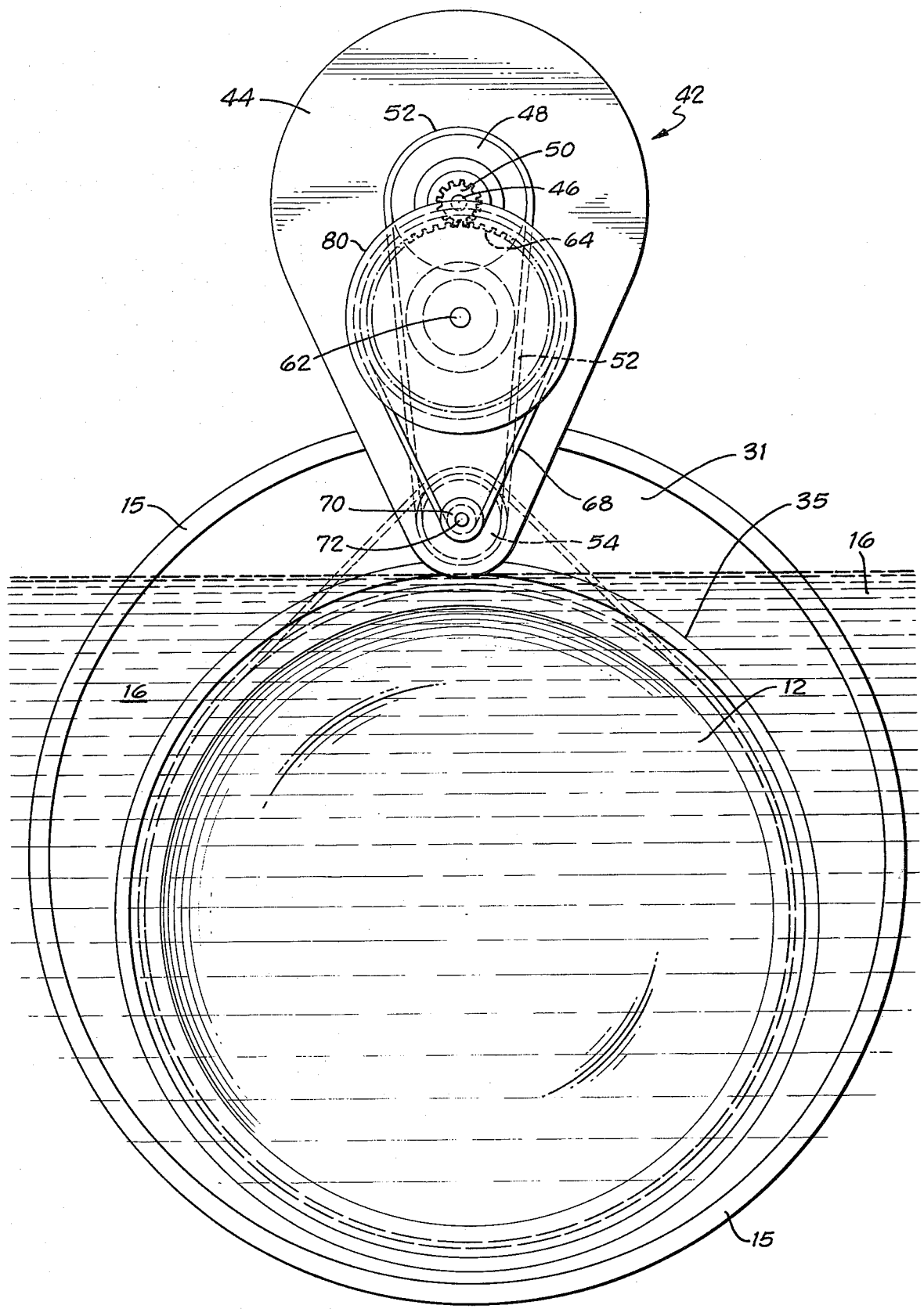
FIG. 2 is a partially broken away end view of the image deflection and focusing assemblies of FIGS. 1 and 3 illustrating the general location of lens and deflection elements and deflection moving means in the housing.

A preferred embodiment of a composite acoustic imaging and image deflection system, and one which is used to describe the application, is illustrated in FIGS. 1 and 2. First consider the focusing elements of the system. The focusing elements themselves may be the same as those described and claimed in the previously referred to copending application entitled "Composite Acoustic Lens", Ser. No. 270,274, filed July 10, 1972. However, for sake of a complete description and because of the unique cooperation between imaging and deflecting parts of the system, the focusing elements and action are again described here.

Focusing action (imaging) for the acoustic imaging and image deflection system illustrated is provided by two solid lens elements 10 and 12, which are both generally biconcave in shape, axially aligned and spaced apart so that a cavity 13 is formed therebetween. For the time being, ignore the elements interposed between the lens elements 10 and 12 (in the cavity 13), as the intermediate elements form part of the image deflection system which is described in detail subsequently. The cavity 13 is filled with a liquid filler medium 14. The composite acoustic lens assembly is intended to be used in a liquid medium; it is therefore illustrated as being housed in a generally cylindrical tube 15 which is immersed in a liquid medium 16 (called the surrounding liquid medium). The cavity 13 within the acoustic lens assembly is sealed from the surrounding liquid medium 16 by lens elements 10 and 12 and their supporting and sealing walls 19 and 31, respectively. That is, each of the ring-like mounting and sealing walls 29 and 31 is sealed at its periphery to the inside of the tubular housing 15 and the lens elements 10 and 12 are hermetically sealed inside circular apertures 33 and 35, respectively, in the two supporting and sealing walls 29 and 31. In the embodiment illustrated room is provided at the top of the housing 15, i.e., above lens elements 10 and 12, for a gear drive mechanism (described subsequently) by making the circular apertures 33 and 35 in the mounting and sealing walls 29 and 31 eccentric. As illustrated, the circular apertures 33 and 35 in the disk-shaped mounting and sealing walls 29 and 31 are offset toward the bottom of the tube 15. The important point, however, is that each lens element 10 and 12 and its mounting and sealing walls 29 and 31, respectively, form a hermetic seal that prevents leakage between the internal cavity 13 and the surrounding medium 16.

In the preferred embodiment, the material of the lens elements 10 and 12 is selected so that the velocity of acoustic waves therein is high as compared to the velocity of those waves in the surrounding medium, hence, the concave or biconcave lens configuration. This general configuration is preferred since acoustic lens designers (see "Sound Focussing Lenses and Waveguides", T. Tarnoczy, ULTRASONICS, July –Sept. 1965, pp. 115–127, and "The Aberrational Characteristics of Acoustic Lenses", B. D. Tartakovskii, SOVIET PHYSICS-ACOUSTICS, Vol. 8, No. 3, Jan.-Mar. 1963 ) generally agree that under the conditions of present usage a concave lens (accelerating acoustic lens) produces less aberration and reflection than a convex (decelerating) one and it is, therefore, better to make acoustic lenses of substances in which the velocity of propagation is greater than in the surrounding environment.

The portion of the total assembly which provides the imaging or focusing action has been described. Now consider the wedge elements 18 and 20 which are interposed between the lens elements 10 and 12 and are provided for the purpose of causing the incident compressional image field to be moved in such a manner that a substantially linear array of discrete transducer elements can transform the full image field to electrical signals from which a visual characterization of the image field can be made, e.g., as on the face of an oscilloscope. Consider first the acoustic wedges 18 and 20 in the stationary position illustrated in FIG. 1 in which the image is transmitted or deflected and essentially unchanged in character and aspect. Next consider the image deflection provided by counterrotation of the wedges, and later the associated apparatus which rotates the wedges 18 and 20 in opposite rotational senses to provide the proper deflection.

The wedges as illustrated are made of the same material as the lenses 10 and 12 and are mounted in an axially aligned relationship along the path of incidence of a compressional image field which is being focused by the lens elements 10 and 12. The wedges 18 and 20 are held in axially aligned relationship with lens elements 10 and 12 by mounting them rotatably in apertures 37 and 39, respectively, of disk-shaped mounting and sealing walls 41 and 43. Each of the ring-like mounting and sealing walls 41 and 43, like the sealing walls 29 and 31 for the lenses 10 and 12, is snug fit at its periphery to the inside of the tubular housing 15 and the circular wedge-holding apertures 37 and 39 are eccentric relative to the walls 41 and 43 such that they are axially aligned with the corresponding eccentric apertures 33 and 35 in the lens-mounting walls 29 and 31. Thus, the wedges 18 and 20 and lenses 10 and 12 are secured in axial alignment.

The wedge 18 (on the left in the illustration) is oriented with its thickest dimension at the bottom and its thinnest dimension at the top. It has a pair of planar surfaces 22 and 24. The inner planar surface 24 is shown normal to the longitudinal axis of assembly housing 15 and the outer planar face 22 slopes relative thereto. With the acoustic wedge 18 stationary, the propagation direction of an incident acoustic wavefield is shifted upward by an angular amount determined by the slope of the surfaces 22 and 24. In the device illustrated the wedge 18, like the lenses 10 and 12, has a circular periphery. The angle 21 included between the planar faces 22 and 24 is 3.7°, with the thickness of the wedge at its thinnest point being one-fourth inch and the thickness at its thickest portion being three-fourth inch.

The acoustic wedge 20 (to the right in the illustration) is identical in every respect to the acoustic wedge 18 except that it is oriented (rotated) 180° about its longitudinal axis relative to acoustic wedge 18. That is, acoustic wedge 20 is of the same material, has a pair of planar surfaces 26 and 28 which include an angle of 3.7° therebetween, and has its thinnest portion one-fourth inch thick) at the bottom of the illustration and its thickest three-fourth inch) at the top. The planar surface 26 of the wedge 20 which is directly adjacent the vertical planar surface 24 of acoustic wedge 18 is also normal to the axis of the assembly housing 15. Thus, for the position shown, acoustic wedge 20 shifts the propagation direction of an incident wavefield downward by precisely the same angular amount that wedge 18 shifts it upward. Consequently, an acoustic wavefield traveling from left to right in the assembly is focused to provide an acoustic image as previously described by the lens elements 10 and 12 and its general position in the image plane (aspect) is unaltered by the acoustic wedges 18 and 20.

With the design principles already described, one skilled in the art should be able to design a lens and image deflection system in accordance with the teaching of the invention. However, in order further to define the elements in the particular system illustrated, it is noted that the inner surfaces of the flat portions of lens elements 10 and 12 are spaced 3 7/16 inches apart and the vertical planar inner faces 24 and 26 of the wedges 18 and 20 are each spaced 1 7/16 inches from the nearest lens element. Thus, wedge elements 18 and 20 are symmetrically located between lens elements 10 and 12 and are spaced 9/16 inch apart.

Note that the first surface (22) of acoustic wedge 18 encountered by an acoustic wavefield traveling from left to right (in the Figure) is precisely parallel to the exit surface 28 of acoustic wedge 20 and the (vertical) exit planar surface 24 of acoustic wedge 18 is parallel to the entry acoustic surface 26 of acoustic wedge 20 for the position shown.

It follows that if acoustic wedges 18 and 20 are rotated in opposite rotational senses, one relative to the other, by 180°, the sloping surfaces 22 and 28 of the two wedges which are parallel to one another, as illustrated in FIG. 1, will again be parallel to each other but will slope in the opposite sense. With such a rotation, the thick portion of acoustic wedge 18 is positioned at the top of the assembly housing 5 and the thinnest portion of acoustic wedge 20 will also be at the top. Thus, a compressional image field incident on the outer planar surface 22 of wedge 18 is shifted down (instead of up, as with the previous case) and is shifted up precisely the same amount by acoustic wedge 20. Again for this position, then, the incident acoustic image is not shifted upon exit from the focusing and deflection assembly.

While other modes of operation are feasible, it is most practical to design the system so that no spherical aberration is produced by the wedge elements 18 and 20, that is, to design the system in such a way that all waves passing through the wedges are planar. This is accomplished by designing the system so that the object plane to be imaged is a focal length from the lens element on which the image plane is incident.

Since the ultimate object of the imaging and deflecting system as illustrated here is to transform the total compressional image field into electrical signals which can subsequently be converted into a visual representation and since the particular means for performing the conversion is comprised of a linear array of transducers (not shown or described here but fully illustrated and described in the application Ser. No. 291,002 supra), the object is to sweep the full image field back and forth across the line of the linear transducer array with no rotary motion of the image. That is, the linear array (not shown) is positioned downstream of the focusing and deflecting assembly in a plane that is horizontal and passes through the central axis of the tubular lens and deflection assembly housing 15 (also defined as a line perpendicular to the axis of alignment and lying in a plane containing the axis of alignment). Thus, the object of the deflecting system is to sweep the image orthogonally past that line without rotational or lateral displacement.

As the acoustic wedges 18 and 20 are rotated in opposite senses but at the same speed (the same number of angular degrees per second), the angle between the initially parallel outer faces 22 and 28 progressively changes from zero at the position illustrated to a maximum when the wedges have each been rotated 90° and back to zero when each of the two wedges have been rotated 180°. As the wedges are further rotated, the angle between the initially sloping but parallel faces 22 and 28 again becomes a maximum in the opposite direction (for 270° rotation) and tne angle again is reduced to zero at the starting position (360° rotation). The combination of the two wedges rotating in opposite senses at the same rotational speed effectively presents a variable angle wedge. Thus the incident compressional acoustic image field is effectively swept up and down past a line perpendicular to the axis of alignment of the elements and lying in a plane containing the axis of alignment. The sweeping action takes place once in each direction for each full rotation of the two acoustic wedges and without rotary or lateral displacement.

In order to provide means for rotatably mounting wedges 18 and 20 in the apertures 37 and 39 in the wedge supporting walls 41 and 43, they are supported in bearing assemblies. Specifically in the embodiment illustrated, ring-like protective bands 30 and 32, respectively, are snug-fit or glued, as by epoxy glue, around the periphery of wedges 18 and 20 and a pair of conventional ball-bearing races is seated within the apertures 37 and 39 in the wedge supporting walls 41 and 43 and around the ring-like protective bands 30 and 32 on the respective wedges 18 and 20 so that the wedges rotate freely in their supporting walls. For reference, the pair of bearing races for wedge 18 on the left in the illustration is given numeral 34 and the pair of races for wedge 20 on the right is given numeral 36. Further for the purpose of imparting the rotary drive forces to rotate the wedges 18 and 20, the ring-like bands 30 and 32 are provided with gear teeth 38 and 40, respectively, all the way around their perimeters on the part of the bands which protrude outside the bearing races.

The reason for mounting the lens and wedge assemblies eccentrically (at the bottom of the illustration) in the cylindrical housing member 15 is to provide the maximum amount of room at the top of the housing for the wedge gear drive assembly with a minimum total housing size. This may best be seen in FIG. 2, where the gear drive mechanism is illustrated schematically above the lens and wedge assembly.

For an understanding of how the drive mechanism is supported and how it works, refer back to FIG. 1. The drive motor 42 is mounted over the cylindrical housing 15 by means of a motor housing bracket 44 rigidly attached to the housing 15 in a conventional manner not specifically shown. The motor housing bracket 44 and its means of attachment to the lens and wedge assembly housing 15 is not shown or described in great detail since it forms no part of the invention. The drive motor 42 is a conventional 1800 revolutions per minute (rpm) electrical motor provided for the purpose of driving the gear mechanism, which in turn drives the two wedges 18 and 20 in opposite rotational senses and at the proper rotational speed. In the application illustrated, the wedges are driven at 450 rpm.

In order to understand the drive mechanism, follow the drive sequence from shaft 46 of motor 42 through the gear train to the individual counterrotating prisms or wedges 18 and 20. It is understood, of course, that the specific drive arrangement is not critical. The motor shaft 46 extends from the motor 42 through the wall of the motor mounting bracket 44. For convenience in the description, assume the motor shaft 46 rotates in the conventional clockwise sense and that it rotates one of the wedges (the wedge 18 on the left in the illustration) in a counterclockwise direction and the other wedge 20 in the clockwise sense. Thus, we can refer to the drive gears and belts for the one wedge (wedge 18) as counterclockwise drive elements and the elements driving the other wedge (wedge 20) as clockwise drive elements. The motor shaft supports a pair of drive gears 48 and 50 which respectively form part of the clockwise and counterclockwise drive arrangements.

Follow first the clockwise drive train for the clockwise rotating wedge 20. The clockwise drive includes an endless timing belt 52 which is driven by the clockwise drive gear 48 and extends around a driven gear 54 (immediately below clockwise drive gear 48). Note that the drive gear 54 is supported at one end of a tubular drive shaft 56 that extends through and is rotatably supported by the portion of the motor mounting bracket plate 44 which extends down past the upper wall of the tubular assembly 15 almost to the top of the lenses and wedges. Tubular clockwise drive shaft 56 also extends through the adjacent lens mounting and supporting wall 31 and the next adjacent wedge mounting and support wall 43. The support walls 31 and 43 provide support for the tubular drive shaft 56 and hold the bearings for it (not shown) as well as seals (also not shown) so that the shaft 56 rotates freely but fluid does not leak either into or out of the inner cavity 13. In order to prevent slippage, the clockwise drive gears 48 and 54 are both provided with teeth around their peripheries and the inner surface of the endless drive belt 52 which extends around the peripheries of both drive gears is provided with engaging teeth (not shown) which match with the teeth on the two gears. Thus, the clockwise drive gear 54 on tubular drive shaft 56 is also given a clockwise rotation.

In the specific device illustrated the relative diameters of the clockwise drive gears 48 and 54 and the relative number of teeth are selected so that the drive gear 54 rotates at 3240 rpm and drives the shaft 56 on which it is mounted at the same speed. The clockwise drive arrangement for clockwise rotating wedge 20 is completed by a clockwise drive gear 58 mounted on the tubular clcokwise driven shaft 56 directly above the drive teeth 40 on the protective band 32 for wedge 20. A timing drive belt 60 extends around the clockwise drive gear 58 on tubular shaft 56 and the toothed portion 40 of protective band 32 of the wedge 20 (on the right). Gear teeth on the drive belt 60 and the gears 54 and 58 prevent slippage. The relative size of the gears and the number of teeth thereon are arranged in the device illustrated so that wedge 20 is driven clockwise at 450 rpm by motor 42.

Next consider the drive arrangement for the counterclockwise rotating wedge 18 starting with the counterclockwise drive gear 50 (actually rotating clockwise) at the outer end (right in the illustration) of motor shaft 46. In order to provide the necessary reversal of rotational direction a reversing idler shaft 62 is mounted for rotation in a rigidly mounted tubular extension 61 on the motor bracket below the motor shaft 42. The tubular extension is provided with bearing races 63 therein which hold the idler shaft rigidly but allow free rotation. The rotation reversal is provided by toothed idler gear 64 which is mounted directly below counterclockwise drive gear 50 and has teeth that mesh directly with the teeth on drive gear 50. In this manner the reversing and idler shaft 62 is driven in a counterclockwise direction (relative to motor drive shaft 46). Here the gear diameters and number of teeth are selected so that reversing and idler shaft 62 rotates at 450 rpm.

To complete the drive arrangement a second counterclockwise drive gear 66 is mounted on idler shaft 62 (therefore rotating in the counterclockwise sense) and drives an internally toothed endless timing belt 68 which also extends around the periphery of a counterclockwise drive gear 70. The counterclockwise drive gear 70 is mounted directly below the counterclockwise idler gear 66 on a shaft 72 that extends concentrically (and for rotation therein) through the center of the clockwise drive shaft 56. In addition counterclockwise drive shaft 72 extends on through the support wall 41 for counterclockwise rotating wedge 18. Again bearings which provide for free rotation of the drive shaft 72 in the support wall 41 are not shown. The ratio of gear diameters and numbers of teeth on the counterclockwise idler and drive gears 66 and 70 are such that counterclockwise drive shaft 72 is driven at 3240 rpm.

The counterrotating mechanism is completed by another counterrotational drive gear 74 mounted at the opposite end of the counterrotational drive shaft 72 directly over the gear teeth 38 on the protective band 30 for the counterrotating wedge 18. An endless timing belt 76 extends around the band 30 and engages the teeth on both the counterrotational drive gear 74 and the band 30 which is fixed to the counterrotating wedge 18 so the wedge is driven in a counterclockwise sense. Again, the diameters of the gear members and the number of teeth thereon are selected so that the counterrotating wedge 18 is also rotated at 450 rpm.

Thus it is seen that both wedges 18 and 20 are rotated in opposite rotational senses at precisely the same rotational speed so that an incident compressional image field which is focused by the lens elements 10 and 12 is deflected up and down past a line perpendicular to the axis of alignment once in each direction for each full rotation of the two acoustic wedges and without rotary or lateral displacement.

It is noted in passing that the idler shaft 62 has a timing disk 80 mounted on the outer end. The timing disk is used to produce, electromechanically, an electrical sweep which is locked in synchronism with the rotating prisms 18 and 20 so that the compressional wave field which is deflected by the wedges can be reproduced on a television screen. The electromechanical sweep generating system using the disk 80 is described and claimed in U.S. Pat. No. 3,849,698, issued Nov. 19, 1974 in the name of Hugh F. Frohbach (assigned to the assignee of the present application).

Now consider the special cooperation of the materials and structures of the imaging and image deflection system. In order to produce the proper focusing effect, the radius of curvature of concave lens surfaces, e.g., surfaces of concave lenses 10 and 12 must generally be fairly short, and, therefore, the faces of each lens must have a large curvature. Also, in order to provide an image deflection sufficient to scan a compressional image field of practical size, acoustic wedges (as wedges 18 and 20) must normally have planar faces which are steep relative to the incident field. It is well known that if sound waves pass between a liquid and solid obliquely, not perpendicularly, shear waves are generated in the solid in addition to the longitudinal waves. The phenomenon is known as mode conversion.

The composite lens and image deflection system design reduces mode conversion and all of the other recognized disadvantages of acoustic lenses and image deflection elements, namely, energy loss due to mode conversion, energy absorption of the materials, aberrations and reproduction errors caused by internal heating.

Energy absorption is minimized in part by judicious selection of the material of the solid lens and wedge elements 10 and 12 and 18 and 20. For example, polystyrene is selected as the material for its low sound absorption characteristics, i.e., low compared to such materials as lucite and glass, and also because of its low reflectivity in water. Aberrations are minimized by design parameters and uilization of the accelerating lens arrangement.

Means and structures of the lens design allow reduction of the curvature of the lens elements required for focusing and slope of wedge faces required for proper image deflection. Thus, energy loss and internal heating due to mode conversion and absorption are minimized. Further, by reducing the required lens curvature and slope of wedge faces, the thickness of the lens elements and acoustic wedges is decreased, resulting in a further reduction in energy absorption. Mode conversion and energy absorption, incidentally, are responsible for internal heating which causes reproduction errors.

These advantages are achieved by properly selecting the materials of liquid filler medium 14, the material of the solid lens and wedge elements 10 and 12 and 18 and 20, respectively, and the surrounding liquid medium 16. For the system illustrated, water is chosen as the surrounding liquid medium 16 because it is one of the best media known for coupling to biological materials since their specific acoustic impedance is approximately equal to that of water. Infact water is a common and generally convenient material as a surrounding medium. As previously indicated the material of the solid lens and wedge elements utilized is polystyrene.

Silicone oils, Freons (a registered trademark of DuPont) and other fluorinated hydrocarbons are among the possible choices for the filler medium 14. Of particular merit are the commercially available fluorinated hydrocarbons of the family given the name Fluorinert by its manufacturer, Minnesota Mining and Manufacturing Company. Specifically, the fluorinated hydrocarbon FC75 is a good choice for the liquid filler medium 14. Acoustic waves with a frequency of 3.5 megahertz (frequency for which the system was designed) have a velocity of 2400 meters per second in polystyrene, 1500 meters per second in water and 600 meters per second in FC75. The mean density of polystyrene is 1.1 gram per cc, that for the distilled water is approximately 1 gram per cc at 25° C and the density of FC75 is 1.77 gram per cc.

The acoustical properties of polystyrene (lens and wedge elements) or the materials for the filler medium 14 alone do not differ enough from water to limit lens curvatures and the slope of wedge faces, but the proper combination of these materials produces a powerful effect. Note that selection of materials for the lens elements 10 and 12, wedges 18 and 20, liquid filler medium 14 and surrounding liquid medium 16 is made so that the velocity of propagation of the incident acoustic waves in the medium, at least on the side of the composite acoustic lens and image deflection assembly where sound waves are incident, is intermediate the velocity of propagation of the acoustic waves in the media of the lens and wedge elements (elements 10 and 12 and 18 and 20) and the fluid filler medium 14.

In the acoustic lens and image deflection assembly illustrated in FIG. 1, the velocity of propagation of the acoustic waves is higher in the solid elements (lens elements 10 and 12 and wedges 18 and 20) than in the surrounding liquid medium 16 and, therefore, the filler medium 14 is selected such that the velocity of propagation of sound waves therein is lower than that in the surrounding liquid medium 16. Further, the ratios of indices of refraction of the materials are made large, resulting in reduced aberration for the given focal length lens (see Drude, THE THEORY OF OPTICS, Dover Publications Inc., 1959). As a refinement, resolution may be improved by the use of the filler medium 16 (FC75 here) on the image side of the assembly instead of water. In one practical design for a major application of the invention, the lens elements 10 and 12 and wedges 18 and 20 have an outside diameter of 9.5 inches with the active portion of the elements (area of curvature of the lenses and deflecting faces of the wedges) having a diameter of 8.5 inches. The radius of curvature of the lenses 10 and 12 which is adjacent the surrounding medium 16 is 12.6 inches and the radius of curvature of the opposite faces (adjacent the liquid filler medium 14) is 36.4 inches. These dimensions give the composite acoustic lens a focal length of about 6 inches.

Figure 3:
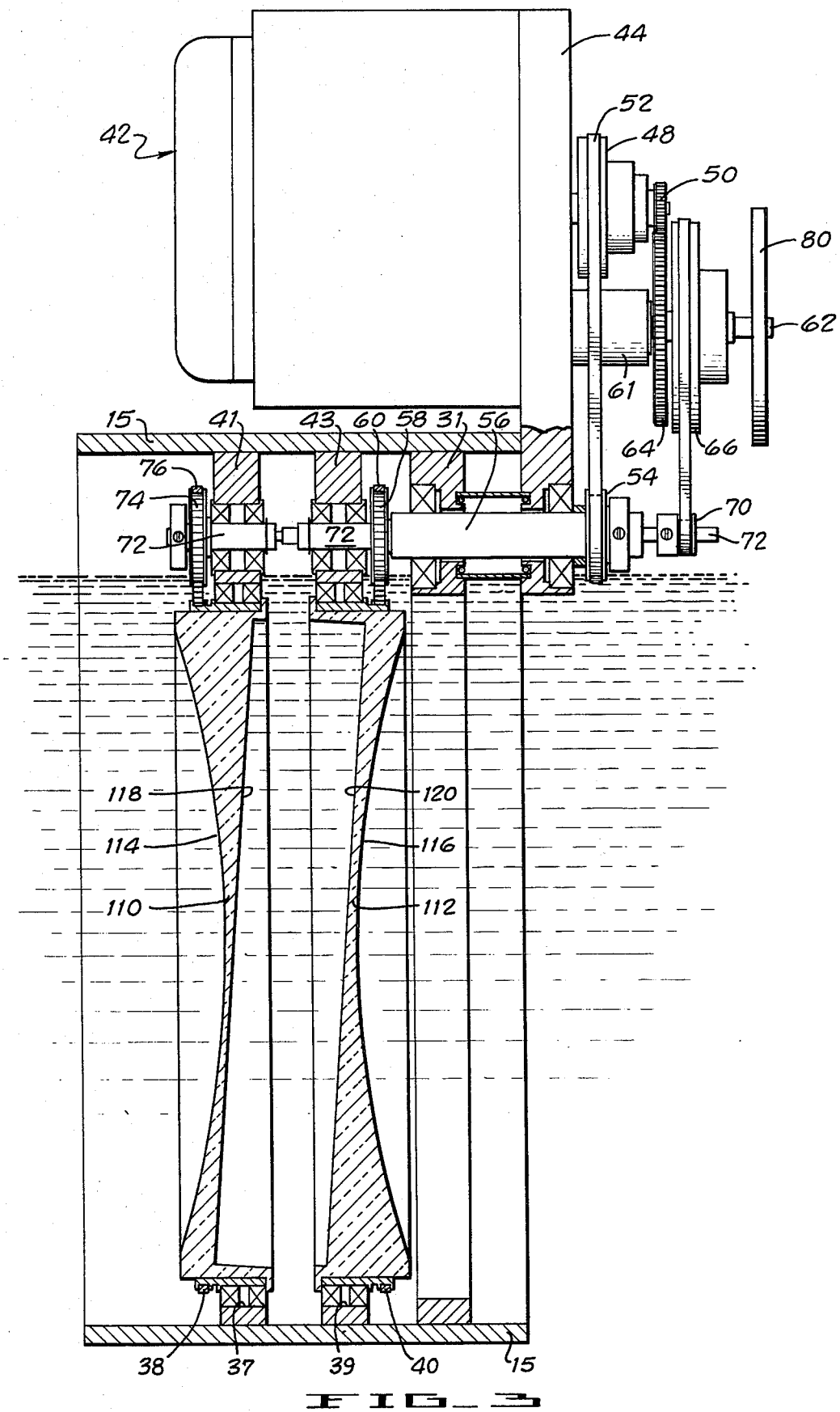

It is practical in some instances to provide the same focusing and image deflection action as that described above with fewer elements. Such an arrangement is illustrated in FIG. 3. In this embodiment the general housing arrangement and drive arrangement will be precisely the same as that described with respect to the embodiment in FIGS. 1 and 2 and, therefore, neither the housing nor the drive elements are fully shown or described again. Further, corresponding elements of the two embodiments are given the same reference numerals. The primary difference in the two embodiments resides in the fact that in the embodiment of FIG. 3 both the imaging and the deflection functions are provided by a single pair of counterrotating lens and wedge elements 110 and 112, respectively. Such lenses may be called prismatic lenses. Both surfaces of prismatic lenses may be curved and tilted, however, the lenses illustrated and described here are the simplest to design and execute. It is to be understood, however, that any properly designed prismatic lenses, that is, ones which properly perform the function described, are contemplated as being within the scope of the present invention.

The outer faces 114 and 116 of the two elements 110 and 112 are given with the concave curvature necessary to provide the proper focusing action for incident compressional image fields. Since the two image focusing and deflecting elememts 110 and 112 are perfectly symmetrical as illustrated here, the image field may be incident from either direction. In order to produce the desired image deflection, the inner faces 118 and 120 of the two elements 110 and 112, respectively, are planar, parallel to each other, and form an angle with respect to the central longitudinal axis of the housing (which is also the central longitudinal axis of the imaging and image deflection elemeents 110 and 112). Since the two faces are parallel to each other, it will be recognized that a compressional image field passing through from either direction will be subjected to the focusing action of the elements 110 and 112 but its aspect will not be changed by the total combination of the two elements. However, as the elements 110 and 112 are rotated at the same speed and in opposite rotational directions, the compressional image field will be shifted up and down in the same fashion described relative to the previous arrangement.

The use of the combination of materials including the sorrounding liquid medium 16 and the material of the lens and deflecting elements (10, 12, 18 and 20 in the embodiment of FIG. 1 and elements 110 and 112 in the embodiment of FIG. 3) enables the desired focusing and deflecting action to take place using lens curvatures and deflecting planes which reduce mode conversion at the surfaces to a minimum. That is to say, the angle of the planar surfaces of the wedges 18 and 20 and of the combined lens and wedge elements 110 and 112 would necessarily have to be so great to provide the required image deflection that mode conversion would be intolerable if it were not for the selection of the entrained filler medium 13 such that the velocity in the surrounding fluid is intermediate that in the lens and deflection elements and in the entrained fluid medium. Use of the low velocity entrained fluid filler medium permits larger deflections, or alternately, smaller prism angles. It also permits better correction of lens aberrations.

The acoustic image deflection and lens assemblies of FIGS. 1 and 2 are highly practical and have been used to illustrate the broad principles of the invention; however, the principles can be extended to such assemblies of many different configurations without departing from the invention. For example, any number of lens or deflecting elements may be included in the assembly, or other element configurations (e.g., plane-o-concave, convex-o-concave, etc.) may be used, or individual lens elements may be made up of a combination of lenses, all without departing from the broad principles of the invention. Further, any number of stops may be included as by interposing them between assembly elements to reduce aberration and lens surfaces may be treated to reduce reflection. It is known, for example, that lens surfaces may be coated or etched (to provide indentations or surface pores) to reduce reflection by the interference principle.

Further, if it is desired to approximate some deflection other than sinusoidal, e.g., triangular, the wedges may be rotated at a nonconstant rate. It is also contemplated that other drive mechanisms may be used; for example, a magnetically coupled drive to the wedges or prisms avoids drive mechanisms entering the sealed chamber and thus avoids sealing problems. In addition, if elliptical interlace in a direction orthogonal to that of mechanical scan is desirable, the planar faces of the deflecting prisms can be made slightly off parallel.

That is to say, that while particular embodiments of the invention are illustrated and described, the invention is not limited to these specific configurations since many modifications in composite acoustic lenses may be made utilizing the inventive principles. It is contemplated that the appended claims will cover any such modifications as fall within the true spirit and scope of the invention.

What is claimed is:

1. In an acoustic imaging and image deflection system for sweeping a compressional acoustic image field past a given line so that every portion of the image field moves past that line, at least a pair of acoustic wedges rotatably mounted in axially aligned relationship along the path of incidence of a compressional image field, each of said acoustic wedges having at least one planar surface forming an angle with the axis of said path of incidence and substantially parallel to the corresponding surface on the other for a given rotational position and means to rotate said acoustic wedges in opposite rotational senses at equal angular displacements while maintaining the said axial alignment whereby the said planar surfaces are substantially parallel for two positions during rotation and whereby the transmitted compressional image field is periodically swept orthogonally past a line perpendicular to the said axis of alignment and lying in a plane containing the said axis of alignment once in each direction for each full rotation of said acoustic wedges and without rotary or lateral displacement with respect thereto.

2. In an acoustic imaging and image deflection system as defined in claim 1, wherein the said parallel surfaces of said wedges are spaced apart and directly opposed.

3. In an acoustic imaging and image deflection system as defined in claim 1, wherein said wedges each have a pair of planar surfaces forming angles relative to the said axis of alignment which are unequal.

4. In an acoustic imaging and image deflection system as defined in claim 3, said planar surfaces of each acoustic wedge being substantially parallel to planar surfaces of the other acoustic wedge for two positions during rotation.

5. In an acoustic imaging and image deflection system as defined in claim 4, one of the said pair of planar surfaces on each wedge being substantially perpendicular to the axis of alignment of said wedges, said perpendicular planar surfaces being spaced apart and directly opposed.

6. An acoustic imaging and image deflection system for simultaneously focusing an incident compressional acoustic image field and sweeping the focused compressional image field past a given line including the combination of lens means axially aligned in the path of an incident compressional acoustic image field whereby said image field is focused and a pair of acoustic wedges also axially aligned in the path of said compressional acoustic image field for the purpose of providing means for moving the image field, each of said acoustic wedges having at least one planar surface forming an angle with the axis of said incident acoustic image field and being parallel to each other for a given rotational position, and means to rotate said acoustic wedges in opposite rotational senses at equal angular displacements while maintaining the said axial alignment whereby the said planar surfaces are parallel at two positions during rotation and whereby the transmitted compressional image field is periodically swept orthogonally past a line perpendicular to the said axis at the point of intersection and in a plane containing the said axis of alignment once in each direction for each full rotation of said acoustic wedges.

7. An acoustic imaging and image deflection system as defined in claim 6, wherein said wedges each have a pair of planar surfaces forming an angle relative to each other and different angles with regard to the said axis of said path of incidence.

8. An acoustic imaging and image deflection system as defined in claim 7, said planar surfaces of each acoustic wedge being substantially parallel to planar surfaces of the other acoustic wedge for two positions during rotation.

9. In an acoustic imaging and image deflection system as defined in claim 8, one of the said pair of planar surfaces on each wedge being substantially perpendicular to the axis of alignment of said wedges, said perpendicular planar surfaces being spaced apart and directly opposed.

10. An acoustic imaging and image deflection system for simultaneously focusing an incident compressional acoustic image field and sweeping the focused compressional image field past a given line including the combination of at least a pair of lens elements axially aligned in the path of an incident compressional acoustic image field whereby said image field is focused and a pair of acoustic wedges also axially aligned in the path of said compressional acoustic image field for the purpose of providing means for moving the image field, said acoustic wedges being located between said pair of lens elements, each of said acoustic wedges having at least one planar surface forming an angle with the axis of said incident acoustic image field and being parallel to each other for a given rotational position, and means to rotate said acoustic wedges in opposite rotational senses at equal angular displacements while maintaining the said axial alignment whereby the said planar surfaces are parallel at two positions during rotation and whereby the transmitted compressional image field is periodically swept orthogonally past a line perpendicular to the said axis at the point of intersection and in a plane containing the said axis of alignment once in each direction for each full rotation of said acoustic wedges.

11. In an acoustic imaging and image deflection system as defined in claim 10, wherein said wedges each have a pair of planar surfaces forming an angle relative to each other and different angles with regard to the said axis of said path of incidence.

12. In an acoustic imaging and image deflection system as defined in claim 11, wherein said planar surfaces of each acoustic wedge are substantially parallel to planar surfaces of the other acoustic wedge for two positions during rotation.

13. In an acoustic imaging and image deflection system as defined in claim 12, one of the said pair of planar surfaces on each wedge being substantially perpendicular to the axis of alignment of said wedges, said perpendicular planar surfaces being spaced apart and directly opposed.

14. A composite acoustic imaging and image deflection system as defined in claim 10 wherein a fluid filler medium is provided between the said lens elements and surrounding each of said acoustic wedges, the said liquid filler medium comprising a fluorinated hydrocarbon.

15. A composite acoustic imaging and image deflection system adapted for use in fluid media incorporating the system defined in claim 10 and wherein said lens elements and acoustic wedge elements are composed of lens and wedge media respectively and a liquid filler medium is provided between said lens elements and surrounding each of said acoustic wedges, the materials of said lens, acoustic wedges and fluid filler being selected so that the velocity of propagation of acoustic waves in the medium at least on one side of said composite acoustic lens is intermediate the velocity of acoustic waves in the media of the said lens and wedge elements and the velocity of propagation of acoustic waves in the said liquid filler medium.

16. A composite acoustic imaging and image deflection system as defined in claim 15, wherein said wedges each have a pair of planar surfaces forming an angle relative to each other and different angles with regard to the said axis of said path of incidence.

17. A composite acoustic imaging and image deflection system as defined in claim 16, said planar surfaces of each acoustic wedge being substantially parallel to planar surfaces of the other acoustic wedge for two positions during rotation.

18. In an acoustic imaging and image deflection system as defined in claim 17, one of the said pair of planar surfaces on each wedge being substantially perpendicular to the axis of alignment of said wedges, said perpendicular planar surfaces being spaced apart and directly opposed.

19. An acoustic imaging and image deflection system for simultaneously focusing an incident compressional acoustic image field and sweeping the focused compressional image field past a given line, including the combination of at least a pair of individual prismatic lens elements axially aligned in the path of an incident compressional acoustic image field whereby means is provided for simultaneously focusing and moving the image field, and means to rotate said acoustic prismatic lens elements in opposite rotational senses at equal angular displacements while maintaining the said axial alignment whereby the transmitted compressional image field is periodically swept orthogonally past a line perpendicular to the said axis at the point of intersection and in a plane containing the said axis of alignment once in each direction for each full rotation of said acoustic prismatic lens elements.

20. A composite acoustic imaging and image deflection system adapted for use in fluid media incorporating the system defined in claim 19 and wherein said prismatic lens elements are composed of a given medium and a liquid filler medium is provided between said prismatic lens elements, the materials of said prismatic lens elements and fluid filler being selected so that the velocity of propagation of acoustic waves in the medium at least on one side of said composite acoustic lens is intermediate the velocity of acoustic waves in the medium of the said prismatic lens elements and the velocity of propagation of acoustic waves in the said liquid filler medium.

21. An acoustic imaging and image deflection system as defined in claim 19 wherein each of said individual prismatic lens elements has a curved surface for focusing an incident compressional acoustic image field and a planar surface, each of said planar surfaces forming an angle with the axis of said incident acoustic image field and being parallel to each other for two positions during rotation.

22. A composite acoustic imaging and image deflection system adapted for use in fluid media incorporating the system defined in claim 20 and wherein said prismatic lens elements are composed of a given medium and a liquid filler medium is provided between said prismatic lens elements, the materials of said prismatic lens elements and fluid filler being selected so that the velocity of propagation of acoustic waves in the medium at least on one side of said composite acoustic lens is intermediate the velocity of acoustic waves in the medium of the said prismatic lens elements and the velocity of propagation of acoustic waves in the said liquid filler medium.

23. A composite acoustic imaging and image deflection system as defined in claim 19 wherein a liquid filler medium is provided between said prismatic lens elements, the said liquid filler medium comprising a fluorinated hydrocarbon.

* * * * *

UNITED STATES PATENT AND TRADEMARK OFFICE
CERTIFICATE OF CORRECTION

PATENT NO. : 3,913,061
DATED : October 14, 1975
INVENTOR(S) : Philip S. Green

It is certified that error appears in the above-identified patent and that said Letters Patent are hereby corrected as shown below:

Col. 7, line 10, delete "horizontal" and substitute -- vertical --.

Col. 7, line 17, after "displacement" and before the period, insert -- with respect to the linear transducer array (since the line defined by the transducer array is in this case described as being vertical and we use "lateral" here to mean along the length of the line, the lateral displacement to be avoided is in fact vertical) --.

Col. 7, lines 34-35, delete "up and down" and substitute -- back and forth --.

Col. 7, line 40, after "displacement" and before the period, insert -- (again, "lateral displacement" meaning displacement along the length of the line of transducers) --.

Col. 9, line 64, delete "up and down" and substitute -- back and forth --.

Col. 9, line 67, after "displacement" and before the period, insert -- i.e., without displacement along the axis of alignment of the transducers --.

Col. 12, line 35, delete "up and down" and substitute -- back and forth --.

Signed and Sealed this twenty-fourth Day of February 1976

[SEAL]

Attest:

RUTH C. MASON
Attesting Officer

C. MARSHALL DANN
Commissioner of Patents and Trademarks